(12) United States Patent  (10) Patent No.: US 9,307,865 B1
Silva  (45) Date of Patent: Apr. 12, 2016

(54) GRILL ASSEMBLY

(71) Applicant: Giovanni M. Silva, Norwalk, CA (US)

(72) Inventor: Giovanni M. Silva, Norwalk, CA (US)

( * ) Notice: Subject to any disclaimer, the term of this patent is extended or adjusted under 35 U.S.C. 154(b) by 653 days.

(21) Appl. No.: 13/624,089

(22) Filed: Sep. 21, 2012

(51) Int. Cl.
*A47J 37/07* (2006.01)

(52) U.S. Cl.
CPC .............. *A47J 37/07* (2013.01); *A47J 37/0704* (2013.01); *A47J 37/0763* (2013.01); *A47J 37/0786* (2013.01)

(58) Field of Classification Search
CPC ................ A47J 37/0704; A47J 37/067; A47J 2037/0777; A47J 37/0713; A47J 37/07; A47J 37/0786; A47J 37/0763; A47J 37/0731; F24C 1/16
USPC ....... 126/25 A, 25 R, 25 AA, 29, 211, 214 C, 126/214 D, 197, 548, 551
See application file for complete search history.

(56) References Cited

U.S. PATENT DOCUMENTS

| | | | | |
|---|---|---|---|---|
| 4,167,177 | A * | 9/1979 | Wigins | 126/531 |
| 4,216,760 | A * | 8/1980 | Wiggins | 126/508 |
| 4,635,613 | A * | 1/1987 | Tucker et al. | 126/25 R |
| 4,886,045 | A * | 12/1989 | Ducate et al. | 126/41 R |
| D348,378 | S | 7/1994 | Crane | |
| D422,456 | S | 4/2000 | Krueger | |
| D451,703 | S | 12/2001 | All | |
| 7,134,552 | B1 * | 11/2006 | McDonagh et al. | 206/545 |
| D560,974 | S | 2/2008 | Goode et al. | |
| 7,383,836 | B2 * | 6/2008 | Klemming | 126/506 |
| 7,387,283 | B2 | 6/2008 | Franczyk | |
| D600,505 | S | 9/2009 | Godinger | |
| 8,127,565 | B1 * | 3/2012 | Lange et al. | 62/246 |
| 8,696,075 | B1 * | 4/2014 | Rios | 312/237 |
| 2006/0102169 | A1 * | 5/2006 | Smolinsky | 126/500 |
| 2014/0026881 | A1 * | 1/2014 | Abrams et al. | 126/25 R |

* cited by examiner

*Primary Examiner* — Steven B Mcallister
*Assistant Examiner* — Steven Anderson, II

(57) ABSTRACT

A grill assembly is provided for selectively partially enclosing or exposing a grilling surface while providing a unique appearance. The assembly includes a base and a base pan coupled to the base. A cover is coupled to the base. The cover has a dome-shape extending over the base pan. The cover has a first section and a second section, each being pivotally coupled to the base. An opening extends laterally into the cover.

6 Claims, 4 Drawing Sheets

GRILL ASSEMBLY

BACKGROUND OF THE DISCLOSURE

Field of the Disclosure

The disclosure relates to grill devices and more particularly pertains to a new grill device for selectively partially enclosing or exposing a grilling surface while providing a unique appearance.

SUMMARY OF THE DISCLOSURE

An embodiment of the disclosure meets the needs presented above by generally comprising a base and a base pan coupled to the base. A cover is coupled to the base. The cover has a dome-shape extending over the base pan. The cover has a first section and a second section, each being pivotally coupled to the base. An opening extends laterally into the cover.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
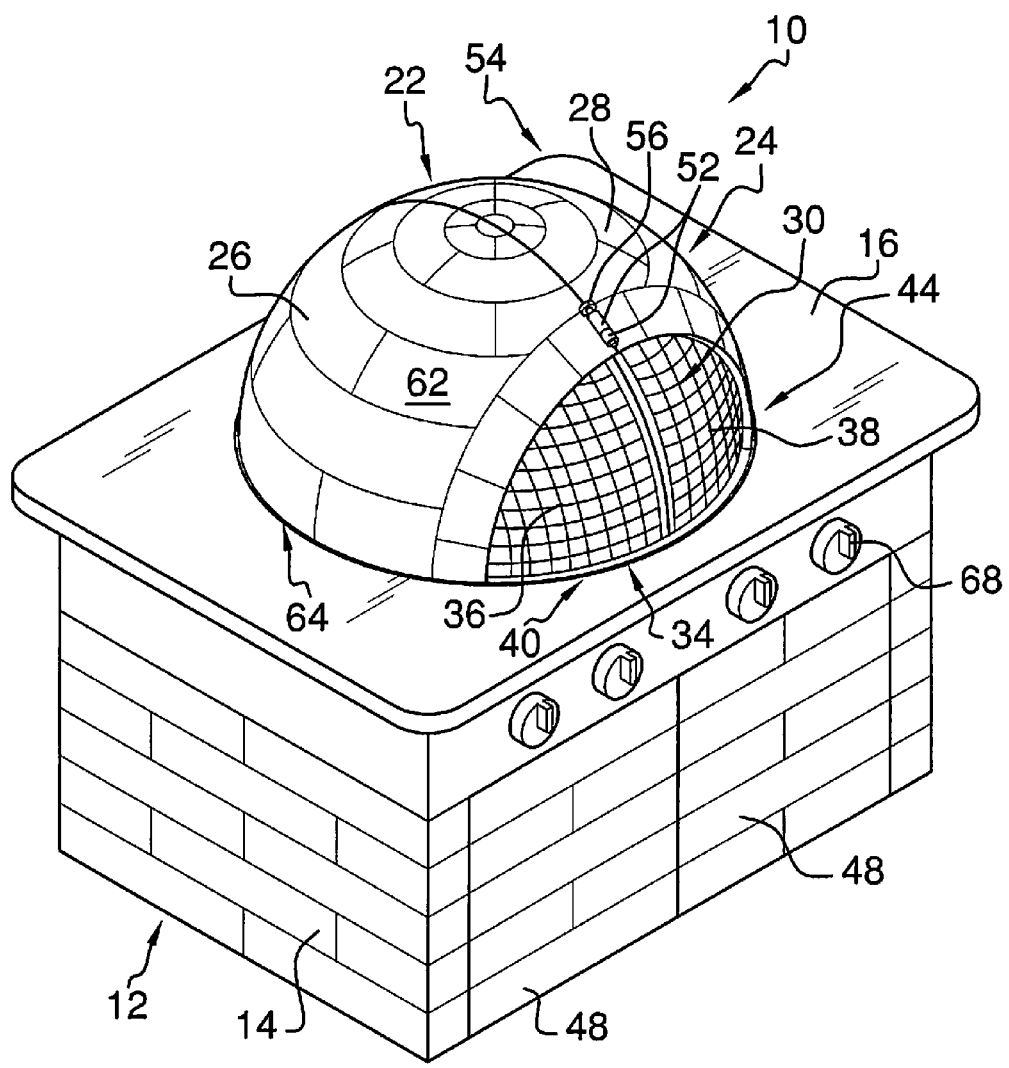
FIG. 1 is a top front side perspective view of a grill assembly according to an embodiment of the disclosure.
Figure 2:
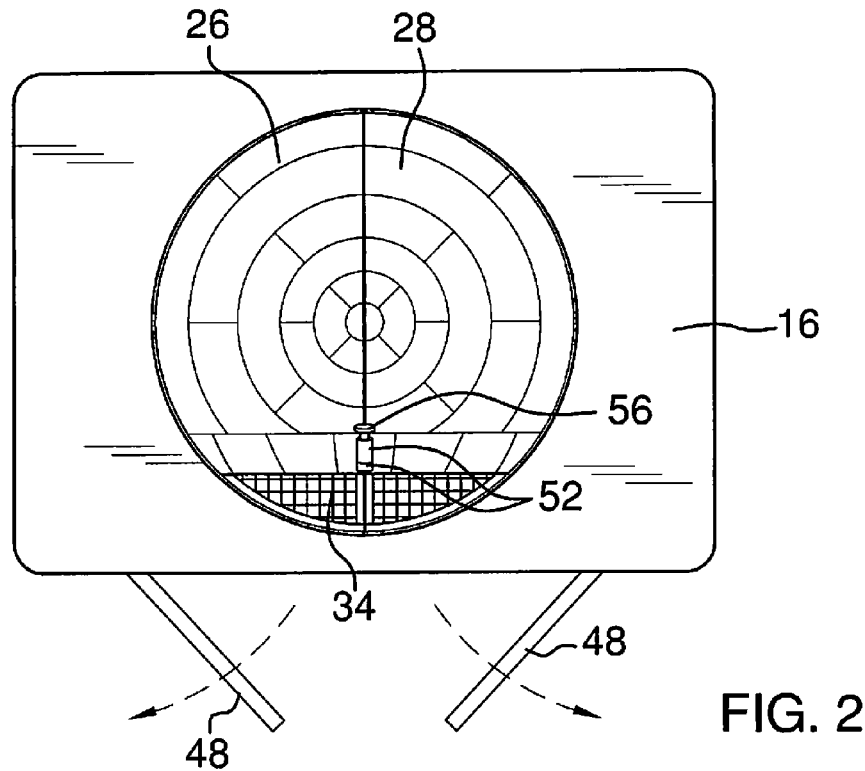
FIG. 2 is a top view of an embodiment of the disclosure.
Figure 3:
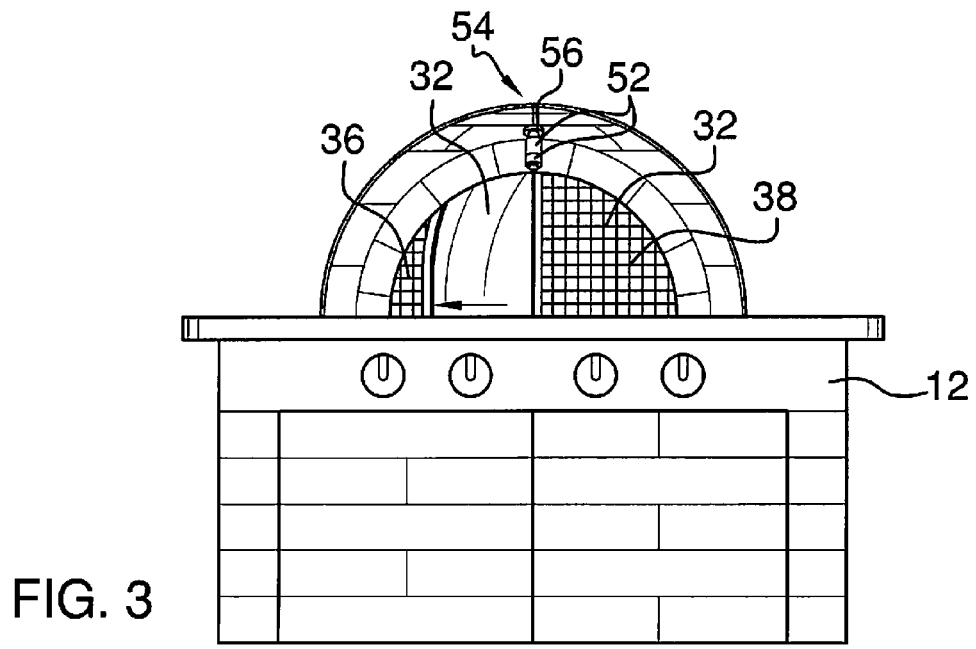
FIG. 3 is a front view of an embodiment of the disclosure.
Figure 4:
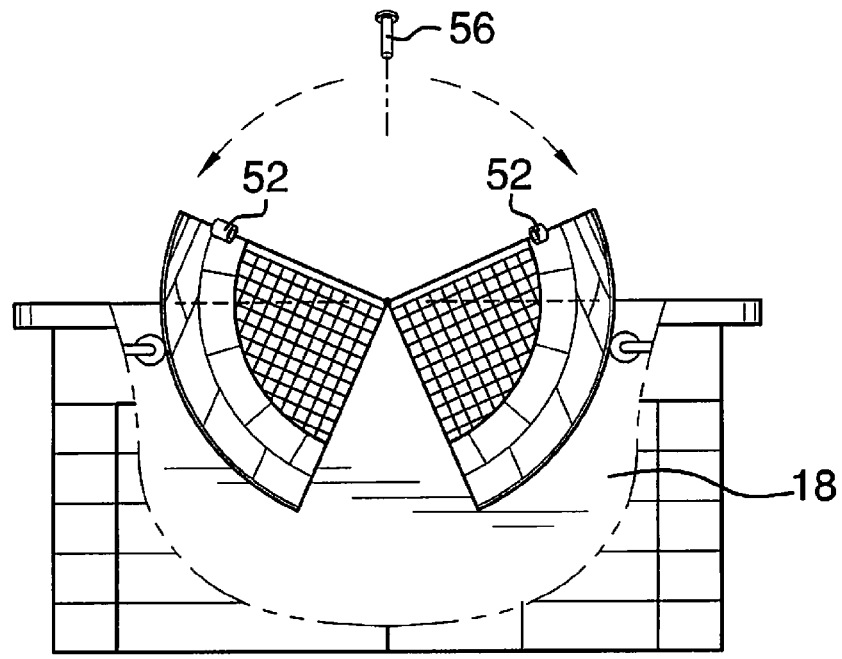
FIG. 4 is a partial cut-away front view of an embodiment of the disclosure.
Figure 5:
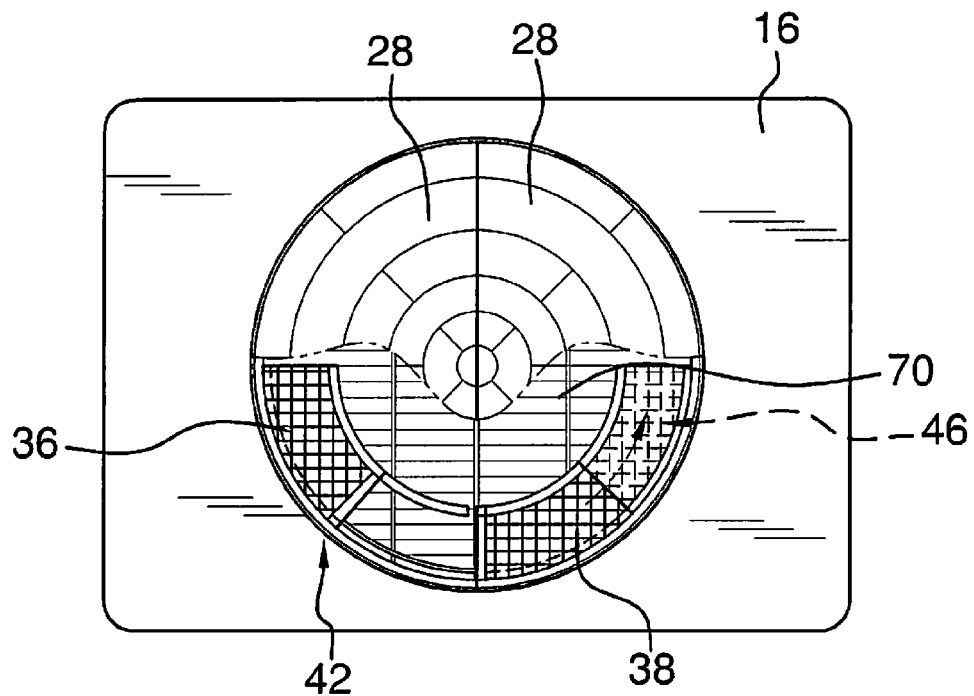
FIG. 5 is a partial cut-away top view of an embodiment of the disclosure.
Figure 6:
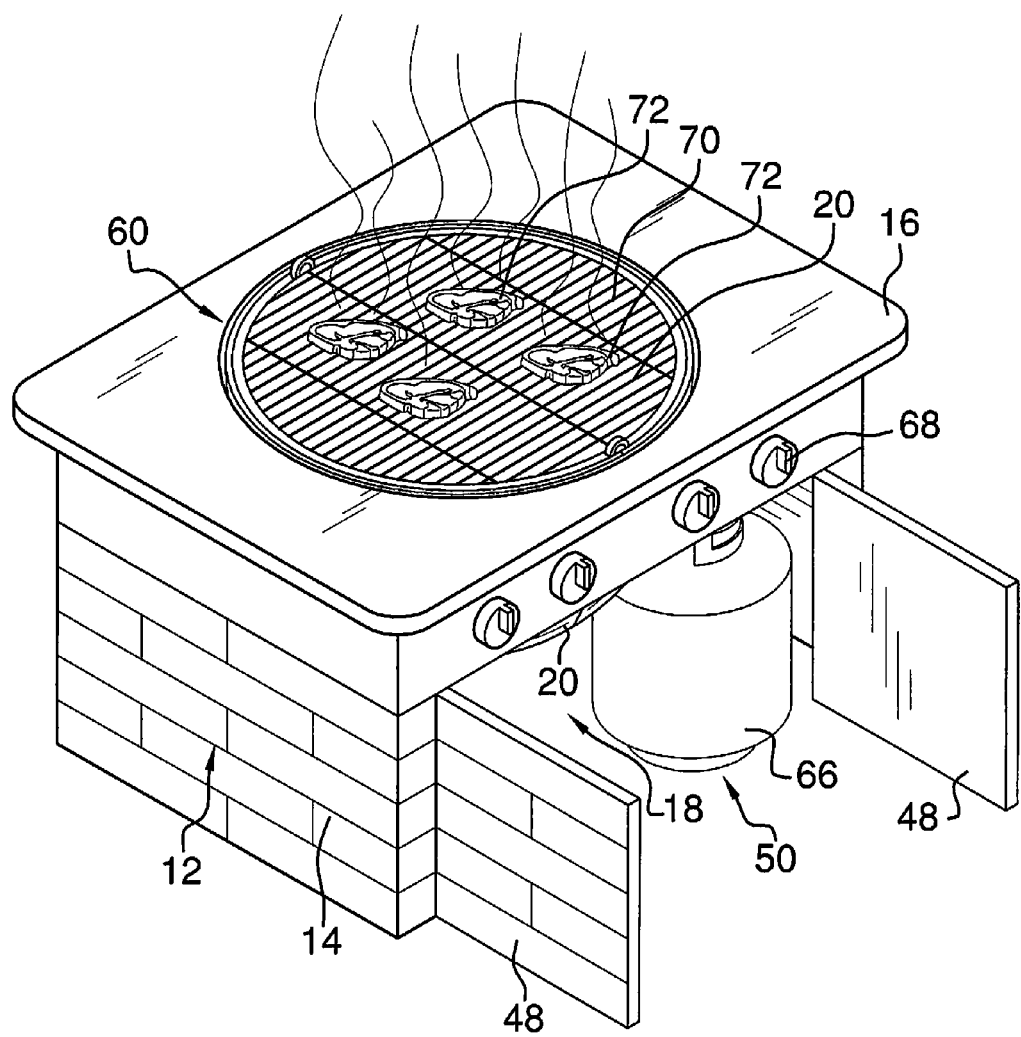
FIG. 6 is a top front side perspective view of an embodiment of the disclosure in use.

With reference now to the drawings, and in particular to FIGS. 1 through 6 thereof, a new grill device embodying the principles and concepts of an embodiment of the disclosure and generally designated by the reference numeral 10 will be described.

As best illustrated in FIGS. 1 through 6, the grill assembly 10 generally comprises a base 12 having a perimeter wall 14 extending around a top 16 of the base 12 defining an interior space 18. A base pan 20 is coupled to the base 12 and positioned in the top 16 of the base 12. The perimeter wall 14 extends around the base pan 20. A cover 22 is coupled to the base 12. The cover 22 has a dome-shape 24 extending over the base pan 20. The cover 22 has a first section 26 and a second section 28 pivotally coupled to each other and the base 12 such that the cover 22 is retractable into the interior space 18 of the base 12. An opening 30 extends laterally into the cover 22 extending upwardly from a bottom edge 80 of the cover 22. The opening 30 may extend through adjacent portions 32 of the first section 26 of the cover 22 and the second section 28 of the cover 22. The first section 26 may be a mirror image of the second section 28. A gate 34 is coupled to the cover 22. The gate 34 selectively covers the opening 30 through the cover 22. The gate 34 may for a screen to provide ventilation through the cover 22 even when the gate 34 is closed over the opening 30. The gate 34 may have a first portion 36 coupled to the first section 26 of the cover 22 and a second portion 38 coupled to the second section 28 of the cover 22. The first portion 36 of the gate 34 is slidable between an extended position 40 and a retracted position 42 relative to the first section 26 of the cover 22. Similarly, the second portion 38 of the gate 34 is slidable between an extended position 44 and a retracted position 46 relative to the second section 28 of the cover 22.

At least one access door 48 is coupled to the perimeter wall 14 to selectively cover an aperture 50 extending through the perimeter wall 14 into the interior space 18. A pair of collars 52 may be provided. Each collar 52 is coupled to an associated one of the first section 26 of the cover 22 and the second section 28 of the cover 22. The collars 52 are aligned when the cover 22 is in a closed position 54 over the base pan 20. A pin 56 is insertable through the aligned collars 52 whereby the cover 22 is secured in the closed position 54. A pair of rollers 58 may be provided and coupled to the base 12. Each of the rollers 58 engages and supports an associated one of the first section 26 of the cover 22 and the second section 26 of the cover 22 as the first section 26 of the cover 22 and the second section 28 of the cover 22 are pivoted into a retracted position 60. An outer surface 62 of the cover 22 may also be structured to resemble a brick dome 64 when the cover 22 is extended over the base pan 20.

The assembly 10 may utilize a propane tank 66 operationally coupled to controls 68 positioned on the base 12. The propane tank 66 may be positioned in the interior space 18 of the assembly 10. When the propane tank 66 is incorporated, the gate 34 may be opened while in the retracted position 60 to allow space for delivering propane from the propane tank 66 to the base pan 20 in a conventional manner.

In use, the cover 22 is opened or closed as desired and fuel is provided to the base pan 20 and ignited to cook food 72 on a grate 70 over the ignited fuel. The gate 34 may also be opened or closed as desired if the cover 22 is left in the closed position 54. Thus, the grill assembly 10 provides grilling of food 72 in various configurations to control heat and smoke around the food 72. The assembly 10 also provides a unique aesthetic appearance.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A grill assembly comprising: a base;
a base pan coupled to said base;
a cover coupled to said base, said cover having a dome-shape extending over said base pan, said cover having a first section and a second section, said first section and said second section each being pivotally coupled to said base such that said first section and said second section are pivotable with respect to each other and are retractable about said base pan;
an opening extending laterally into said cover; and
a gate coupled to said cover, and said gate selectively covering said opening through said cover, said gate having a first portion retractable into said first section of said cover and a second portion retractable into said second section of said cover,
further including said opening extending through adjoining portions of said first section of said cover and said second section of said cover.

2. The assembly of claim 1, further including said first portion of said gate being slidable between an extended position and a retracted position relative to said first section of said cover and said second portion of said gate being slidable between an extended position and a retracted position relative to said second section of said cover.

3. The assembly of claim 1, further comprising:
said base having a perimeter wall extending around said base pan defining an interior space; and
at least one access door coupled to said perimeter wall and selectively covering an aperture extending through said perimeter wall.

4. The assembly of claim 1, further comprising:
a pair of collars, each collar being coupled to an associated one of said first section of said cover and said second section of said cover, said collars being aligned when said cover is in a closed position over said base pan; and
a pin insertable through said aligned collars whereby said cover is secured in said closed position.

5. The assembly of claim 1, further including a pair of rollers coupled to said base, each of said rollers engaging and supporting an associated one of said first section of said cover and said second section of said cover as said first section of said cover and said second section of said cover are pivoted into a retracted position.

6. A grill assembly comprising:
a base, said base having a perimeter wall extending around a top of said base defining an interior space;
a base pan coupled to said base and positioned in said top of said base, said perimeter wall extending around said base pan;
a cover coupled to said base, said cover having a dome-shape extending over said base pan, said cover having a first section and a second section, said first section and said second section each being pivotally coupled to said base;
an opening extending laterally into said cover, said opening extending through adjoining portions of said first section of said cover and said second section of said cover;
a gate coupled to said cover, said gate selectively covering said opening through said cover, said gate having a first portion coupled to said first section of said cover and a second portion coupled to said second section of said cover, said first portion of said gate being slidable between an extended position and a retracted position relative to said first section of said cover and said second portion of said gate being slidable between an extended position and a retracted position relative to said second section of said cover;
at least one access door coupled to said perimeter wall and selectively covering an aperture extending through said perimeter wall;
a pair of collars, each collar being coupled to an associated one of said first section of said cover and said second section of said cover, said collars being aligned when said cover is in a closed position over said base pan;
a pin insertable through said aligned collars whereby said cover is secured in said closed position; and
a pair of rollers coupled to said base, each of said rollers engaging and supporting an associated one of said first section of said cover and said second section of said cover as said first section of said cover and said second section of said cover are pivoted into a retracted position.

* * * * *